United States Patent
Kuriyama et al.

[19]

[11] Patent Number: 6,081,304
[45] Date of Patent: Jun. 27, 2000

[54] IMAGE DISPLAY APPARATUS

[75] Inventors: Toshihide Kuriyama; Keizou Yamada, both of Tokyo, Japan

[73] Assignee: NEC Corporation, Tokyo, Japan

[21] Appl. No.: 09/196,557

[22] Filed: Nov. 20, 1998

[30] Foreign Application Priority Data

Nov. 27, 1997 [JP] Japan ..................................... 9-326706

[51] Int. Cl.$^7$ ............................... H04N 5/64; G09G 3/02
[52] U.S. Cl. ................................................. 348/838; 345/8
[58] Field of Search .................................... 348/825, 838; 359/482, 879, 880; 351/41, 50; 345/7, 8, 9

[56] References Cited

U.S. PATENT DOCUMENTS

| | | | |
|---|---|---|---|
| 2,739,508 | 3/1956 | Reed | 359/880 X |
| 3,059,519 | 10/1962 | Stanton | 348/825 X |
| 4,257,691 | 3/1981 | Brooks | 359/482 X |
| 4,934,806 | 6/1990 | Berke et al. | 359/880 X |
| 5,003,300 | 3/1991 | Wells | 348/838 X |
| 5,189,512 | 2/1993 | Cameron et al. | 348/838 |
| 5,334,991 | 8/1994 | Wells et al. | 345/8 |
| 5,682,173 | 10/1997 | Holakovsky et al. | 345/8 |
| 5,867,134 | 2/1999 | Alvelda et al. | 345/9 X |

FOREIGN PATENT DOCUMENTS

| | | |
|---|---|---|
| 4-100088 | 4/1992 | Japan . |
| 6-121256 | 4/1994 | Japan . |
| 6-138499 | 5/1994 | Japan . |
| 94/01798 | 1/1994 | WIPO ........................................ 345/8 |

OTHER PUBLICATIONS

R. Jones et al., "Automatic Dependent Surveillance Broadcast via GPS–Spuitter a major upgrade to the National Airspace System", SPIE, vol. 2464, 1953, pp. 2–13.

Michael Tidwell, "A Virtual Retinal Display for Augmenting Ambient Visual Environments", Chapter 7, No Date Given.

*Primary Examiner*—Peter M. Cuomo
*Assistant Examiner*—James O. Hansen
*Attorney, Agent, or Firm*—Sughrue, Mion, Zinn Macpeak & Seas, PLLC

[57] ABSTRACT

The present invention provides an image display apparatus capable of easily displaying a bright image having a sufficiently great field of view. The image display apparatus comprises: an optical scanner provided on a bow portion of a spectacle frame and having a movable mirror for deflecting/scanning a beam modulated by a video signal; and a first curved mirror and a second curved mirror provided at right and left of the lens for successively reflecting and focusing the scan beam to be projected into a pupil of a user to form a scanned image on a retina.

18 Claims, 4 Drawing Sheets

IMAGE DISPLAY APPARATUS

BACKGROUND OF THE INVENTION

1. Field of the Invention

The present invention relates to an image display apparatus and in particular, to a small-size light in weight spectacles-type image display apparatus.

2. Description of the Related Art

Conventionally, various types of image display apparatus have been suggested for deflecting a beam modulated by a video signal for horizontal scan and vertical scan, so that the scan beam is projected by a projection optical system into a pupil of a user so as to be focused on a retina to display a scanned image. These image display apparatuses employ a method so that a light emitted from a light source is effectively introduced into eyes, realizing an image display apparatus of a low power consumption.

For example, Japanese Patent Publication (unexamined) No. A-4-100088 [1] discloses a direct view type image display apparatus using an acousto-optical deflector for horizontal scan and a galvanometric mirror for vertical scan of a laser beam, and a focusing system constituted by two lenses.

Moreover, Japanese Patent Publication (unexamined) No. A-6-138499 [2] discloses a direct retina type scan display apparatus as an image display apparatus built in spectacles. FIG. 6 shows a configuration of this direct retina type scan display. This direct retina type scan display includes: a reflector 101 such as spectacle lenses, an optical scanner 102, a fiber relay 104, a laser source 105, and a frame 106. A laser beam emitted from the optical scanner 102 provided on a bow of the frame 106 is reflected by the reflector 101 so as to be projected into a pupil.

Moreover, Japanese Patent Publication (unexamined) No. A-6-121256 [3] discloses a direct retina scan type display apparatus using a planer type image sensor. FIG. 7 shows an optical system of this direct retina scan type display apparatus. This direct retina scan type display apparatus includes: an optical wave-guide channel 201, diffraction optical element 202, an optical wedge 203, a deflection system 204, a laser/modulator 205, and an electron circuit 206. The light beam from the laser/modulator 205 is deflected/scanned by the deflection system 204 and re-oriented by the planer type image sensor having the optical wedge 203, the optical wave-guide channel 201, and the diffraction optical element 202, so that the light beam is directed toward an operator's eye so as to form a virtual image on the retina.

Furthermore, a virtual image type display apparatus has been suggested in the proceeding of SPIE, No. 2464, 1953, pp. 2 to 13 [4]. FIG. 8 shows a configuration of an optical system of this virtual image type display apparatus. This virtual image type display apparatus includes: a mirror 301, a beam splitter 302, and an optical scanner 303. This apparatus has an optical system identical to the one used in a conventional liquid crystal display apparatus. The light emitted from the optical scanner 302 is reflected by the mirror 101 and introduced via the beam splitter 302 into the pupil.

However, these conventional image display apparatuses have various problems as follows.

The direct view type image display apparatus disclosed in Document [1] employs an acousto-optical deflector. This increases the entire apparatus size and cannot reduce the size and weight.

On the other hand, the direct retina scan display apparatus disclosed in Document [2] can be built in spectacles but has a disadvantage that a comparatively large scan or deflection angle is required for the laser beam shift distance between the light source and the retina.

In order to improve this disadvantage, the applicant of Document [2] has suggested the direct retina scan display apparatus using the planer type image sensor disclosed in Document [3] and shown in FIG. 7. However, this apparatus uses a multi-reflection by total reflection of light in the wave-guide channel 201 of the planer type image sensor. Accordingly, the optical wave-guide channel should have a sufficient thickness so that the light finally diffracted by the diffraction element to be introduced into the eye is not overlapped by the light reflected in the wave-guide channel. For example, in order to display an image with 30 degrees as the angle of visibility, the diffraction optical element 202 has a diameter of about 1 cm at 2 cm from the eye. In order to prevent overlap with an adjacent reflected light, the optical wave-guide channel 201 needs to have a thickness of about 3 mm assuming 60 degrees for the final incident angle of the reflected light. This increases the weight of the lens portion of the spectacles, thereby causing the spectacles to be too heavy for the user.

Moreover, the virtual image type display apparatus disclosed in Document [4] and shown in FIG. 8 includes an optical system identical to the one used in a conventional liquid crystal display apparatus having the mirror 301 and the beam splitter 302. This significantly increases the entire apparatus size and the beam splitter 302 decreases the light quantity and does not effectively use the light.

SUMMARY OF THE INVENTION

It is therefore an object of the present invention to provide an image display apparatus capable of easily displaying a bright image having a sufficiently great field of view with an optical scanner which does not substantially increase the weight of the entire apparatus.

In order to achieve the aforementioned object, the image display apparatus according to the present invention comprises: a lens supported by a spectacle frame; an optical scanner provided on a bow portion of the spectacle frame and having a movable mirror for deflecting/scanning a light beam modulated by a video signal so as to output a scan beam toward the lens; and a first curved mirror and a second curved mirror provided as curved portions at right and left of the lens for successively reflecting and focusing the scan beam so as to be projected into a pupil to form a scanned image on a retina.

Moreover, the first curved mirror is formed in the vicinity of a connection point with the bow and the second curved mirror is formed at a position corresponding to a pupil.

Moreover, a distance from the movable mirror to the first curved mirror is approximately equal to a focal distance of the first curved mirror; a distance from the first curved mirror to the second curved mirror is a sum of focal distances of the first curved mirror and the second curved mirror; and a distance from the second curved mirror to the pupil is approximately equal to a focal distance of the second curved mirror.

Moreover, the first curved mirror has a focal distance greater than a focal distance of the second curved mirror.

Moreover, the movable mirror consists of a single silicon mirror capable of rotating/vibrating around two axes, or two silicon mirrors, each capable of rotating/vibrating around a single axis.

Furthermore, the image display apparatus further comprises a light source formed on a silicon substrate including a plurality of semiconductor lasers having different oscillation wavelengths from one another and an optical waveguide channel having input ends connected to the semiconductor lasers and a single output end for outputting the respective beams.

DESCRIPTION OF THE PREFERRED EMBODIMENTS

Description will now be directed to embodiments of the present invention with reference to the attached drawings.

Figure 1:
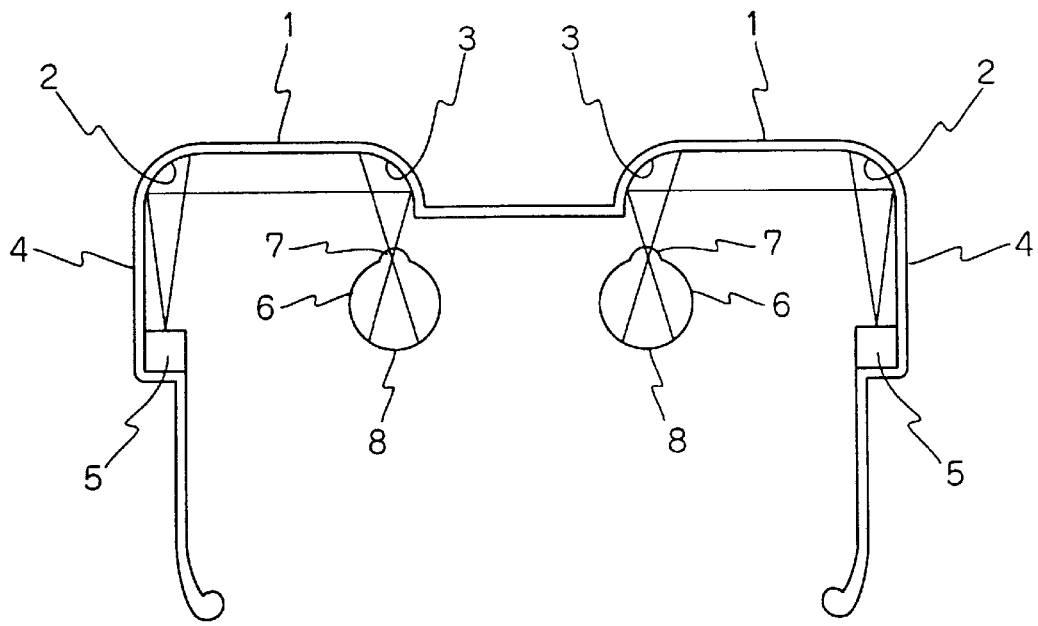
FIG. 1 shows a configuration of an image display apparatus according to an embodiment of the present invention.
Figure 2:
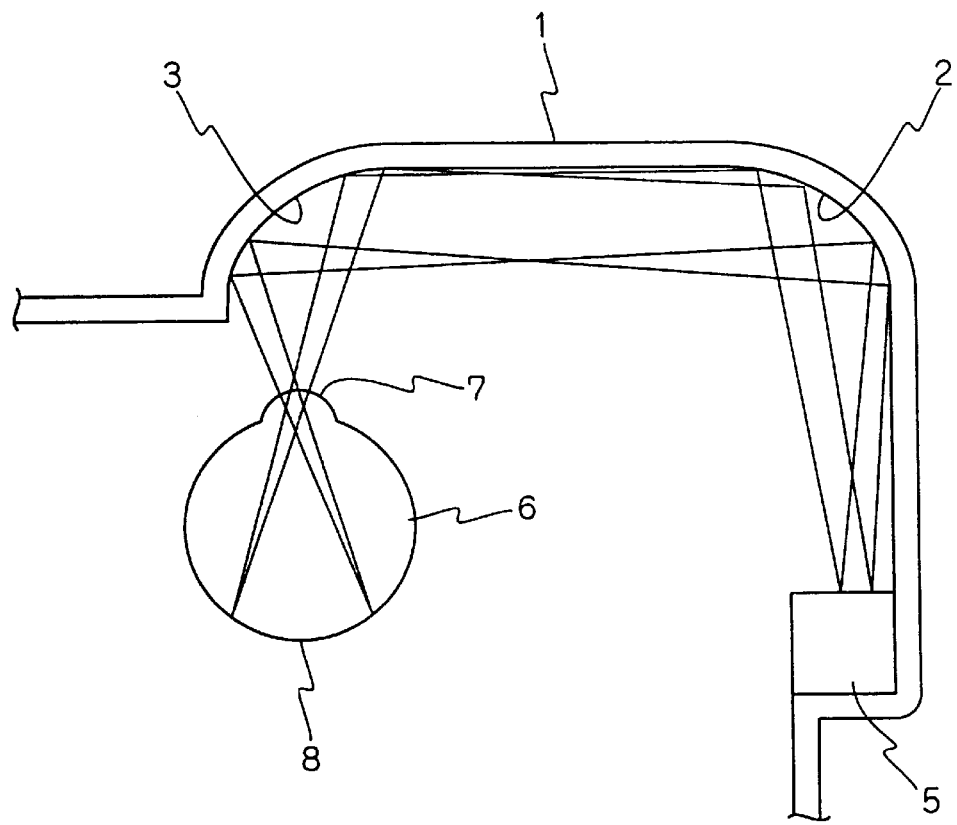
FIG. 2 is an enlarged plan view showing an optical system of the image display apparatus of FIG. 1.

FIG. 1 shows an image display apparatus according to an embodiment of the present invention. FIG. 2 is an enlarged plan view showing an optical system of the image display apparatus of FIG. 1.

With reference to FIG. 1 and FIG. 2, the image display apparatus according to the present embodiment includes: a spectacle lens 1; an optical scanner 5 arranged on a bow portion of the spectacle frame supporting the spectacle lens 1 and having a light source and a movable mirror; a first curved mirror 2 and a second curved mirror 3, respectively formed continuously with the lens 1. The optical scanner 5 uses the movable mirror to deflect/scan a light beam modulated by a video signal.

The first curved mirror 2 and the second curved mirror 3 respectively reflect and focus the scan beam from the optical scanner 5 so as to be projected into the pupil 7 of the eyeball 6. Here, the beam focusing in the vertical direction is identical to the beam focusing in the horizontal direction. Moreover, the first curved mirror 2 is formed in the vicinity of a position where a bow is connected to the lens 1, whereas the second curved mirror 3 is formed on the lens 1 in front of the pupil. Moreover, a distance between the movable mirror and the first curved mirror is set equal or almost equal to the focal distance of the first curved mirror; a distance between the first curved mirror and the second curved mirror is set to a value equal to or almost equal to a sum of the focal distances; and a distance between the second curved mirror and the pupil is set to a value equal or almost equal to a focal distance of the second curved mirror. Furthermore, the first curved mirror has a focal distance set to be greater than a focal distance of the second curved mirror.

In the present embodiment, the optical scanner 5 includes a light source and a movable mirror for deflecting/scanning in synchronization with a video signal, a beam whose luminance has been modulated by the video signal. Similarly as in the conventional optical scanner, a high-speed scanning in horizontal and vertical directions is carried out to output a scan beam.

Figure 3:
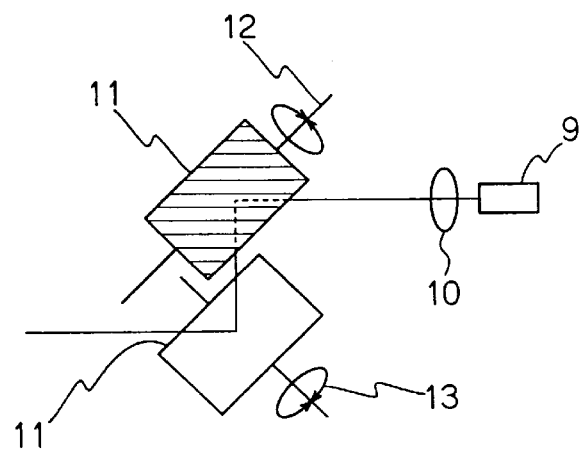
FIG. 3 shows a configuration example of an optical scanner 5 of the image display apparatus of FIG. 1.

FIG. 3 is a block diagram showing a configuration example of this optical scanner 5. This optical scanner includes: a light source 9 having a semiconductor laser for emitting a visible light whose intensity is modulated by a video signal; a collimator lens 10 for making the beam from this light source 9 into parallel or almost parallel beam; a movable mirror 11 consisting of two silicon mirrors for horizontal and vertical scans of the beam, each vibrating to rotate around an axis; twist cross-beams 12 and 13 made from silicon to support the movable mirrors. Although not depicted, these twist cross-beams 12 and 13 have other ends connected to a silicon frame made as a unitary block with the movable mirror 11 and the twist cross-beams 12 and 13. Accordingly, the optical scanner 5 can be made in a size of about 1 cm or below if the diameter of the scan beam is selected to be about 1 to 5 mm. This enables mounting of the optical scanner 5 on the bow 4 of the spectacle frame. Moreover, the movable mirror 11 and the twist cross-beams 12 and 13 supporting the movable mirror 11 are made from a silicon as a unitary block. Because the silicon has a specific weight as small as about 2.33, it is possible to obtain a light and strong mirror with least defects.

For example, if the silicon movable mirror for horizontal scan is a silicon mirror having a surface area of $2 \times 2$ mm$^2$ and a thickness of 50 microns and is supported by a silicon twist cross-beam having an identical thickness, then it is possible to set the resonance frequency to a frequency of horizontal scan, for example, 16 kHz. Moreover, the silicon mirror for vertical scan has an identical configuration so as to scan the light beam reflected by the horizontal scan mirror. The vertical scan mirror is a silicon mirror having a surface area of 2 mm (length)×3 mm (width) and a thickness of 500 microns, and is supported by a silicon twist cross-beam having a thickness of 50 microns. This enables to set the resonance frequency to a frequency of vertical scan, for example, 60 Hz.

Figure 4:
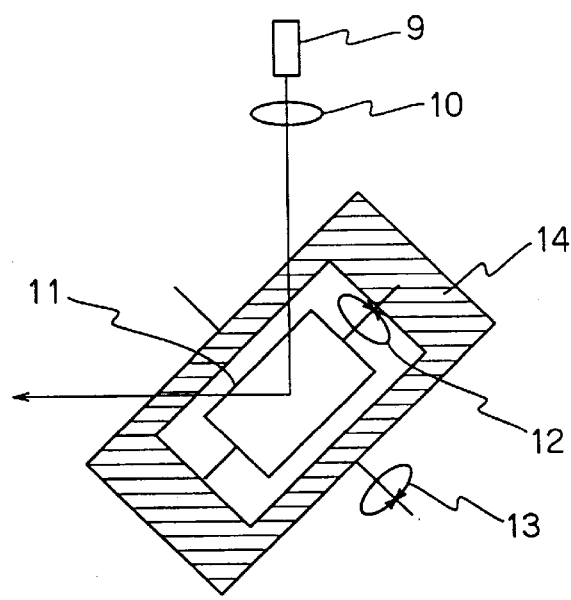
FIG. 4 shows another configuration example of the optical scanner 5 of the image display apparatus of FIG. 1.

FIG. 4 is a block diagram showing another configuration of the optical scanner 5. This optical scanner 5 includes: a semiconductor laser 9 for emitting visible rays whose intensity is modulated by a video signal; a collimator lens 10; a movable mirror 11; twist cross-beams 12 and 13; and a silicon intermediate support body 14 made as a unitary block with the movable mirror 11 and the twist cross-beams 12 and 13. In this case, the movable mirror 11 vibrates to rotate around two axes without requiring two mirrors. In the same way as the optical scanner 5 in FIG. 3, the optical scanner 5 of FIG. 4 has a size of about 1 cm or below and can be mounted on the bow 4 of the spectacle frame.

Figure 5:
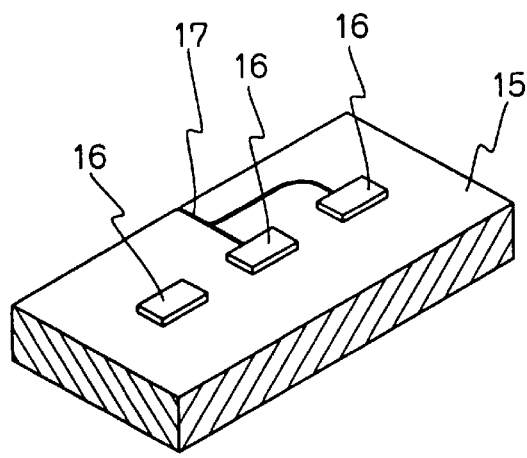
FIG. 5 is a perspective view showing a configuration example of a light source 9 of the optical scanner 5 shown in FIG. 3 and FIG. 4.
Figure 6:
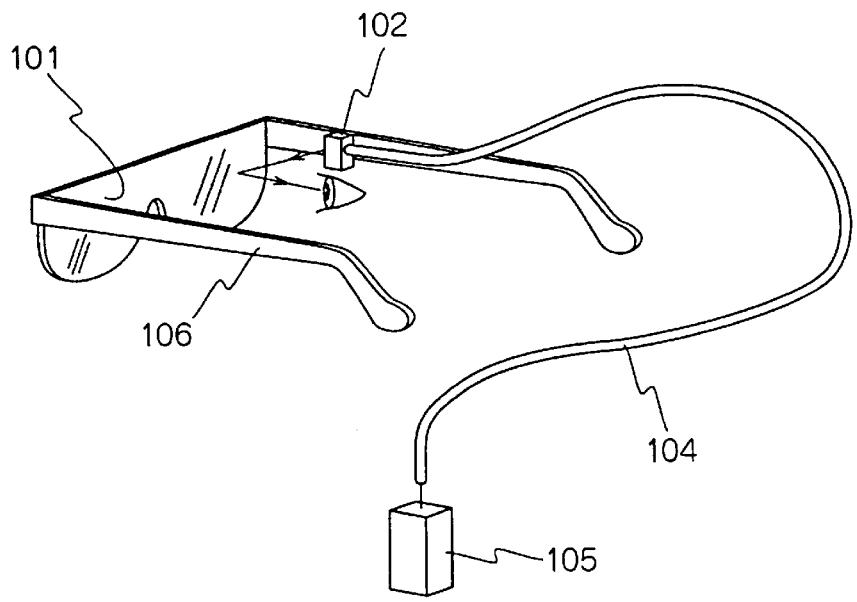
FIG. 6 shows a configuration example 1 of a conventional image display apparatus.
Figure 7:
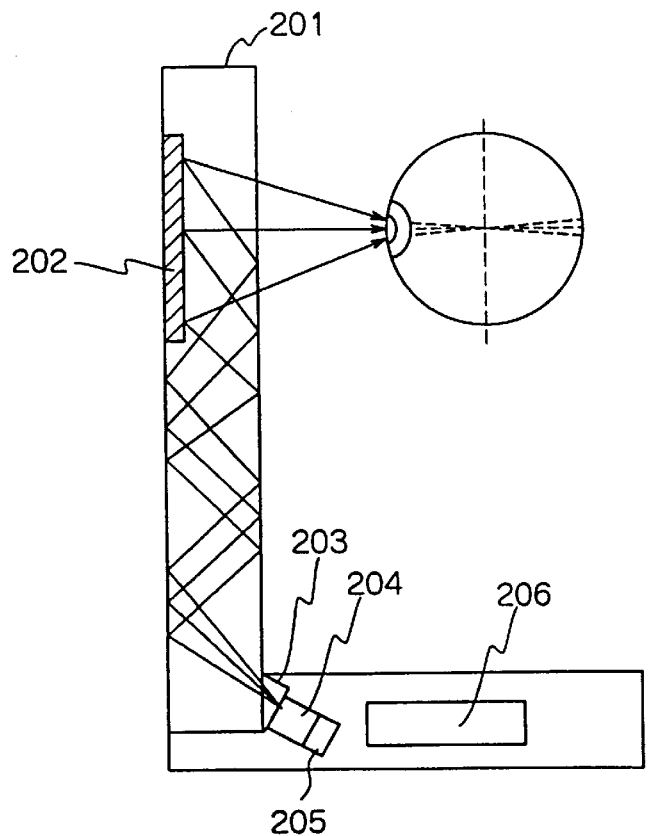
FIG. 7 shows another configuration example 2 of a conventional image display apparatus.
Figure 8:
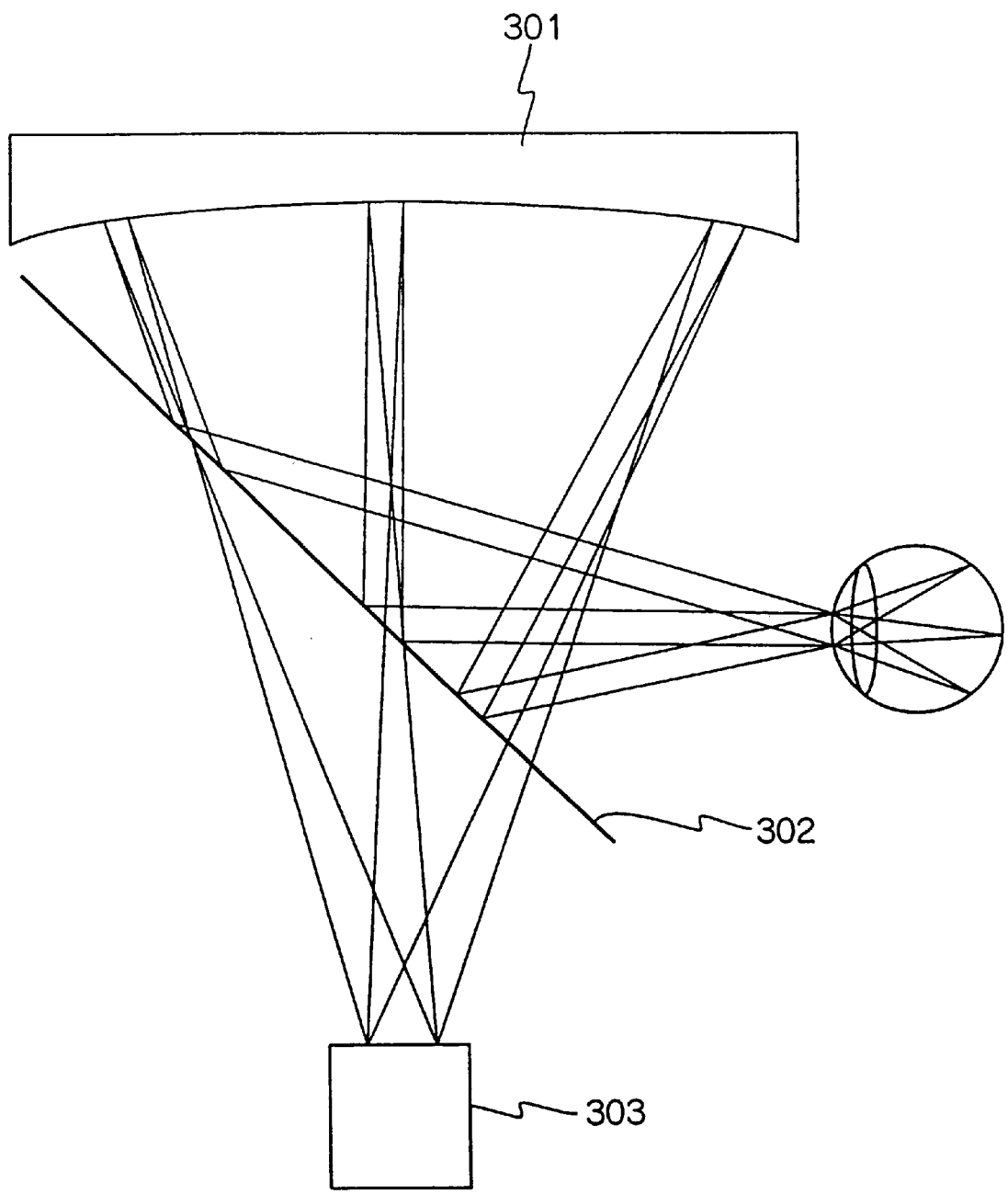
FIG. 8 shows still another configuration example 3 of a conventional image display apparatus.

FIG. 5 is a perspective view showing a configuration example of the light source 9 of the optical scanner 5 shown in FIG. 3 and FIG. 4. This light source 9 includes: a silicon substrate 15; three semiconductor lasers 16 for emitting lights of different oscillation wavelengths corresponding to the three primary colors of light; and an optical wave-guide channel 17 having input ends connected to the three semiconductor lasers 16 so as to output from a single output end the respective light beams inputted. This optical wave-guide channel 17 is prepared by way of epitaxy of glasses having different indexes of refraction on the silicon substrate 15 and etching of the glasses. This optical wave-guide channel 17 has a function identical to a communication optical fiber. For example, this optical wave-guide channel 17 consists of a center portion made from a glass of a high refraction index having a cross sectional area of 10 microns×10 microns and a peripheral portion made from a glass of a low refraction index having a thickness of 15 microns. This enables propagation of a laser beam in a single mode, enabling to generate a beam of a high parallelism through the collimator lens. Moreover, the lights introduced into the three semiconductor lasers 16 for color display are collected into a single optical wave-guide channel so as to be outputted from a single output end. Moreover, by integrating the three semiconductor lasers on a silicon substrate 5, it is possible to provide a small-size and light-weight color light source having a size of 1 cm$^3$ or below. Thus, the optical scanner 5 can be mounted together with the movable scan mirror 11 on the bow 4 of the spectacle frame.

Next, explanation will be given on effects of the projection optical system in the image display apparatus according to the present embodiment.

In the image display apparatus according to the present embodiment, the beam modulated by a video signal is deflected/scanned in horizontal and vertical directions in synchronization with this video signal, so as to be outputted as a scan beam. This scan beam is reflected and focused successively by the first and the second curved mirrors 2 and 3 formed at right and left of the lens 1, so as to be projected into the pupil 7 of the eyeball 6 and focused on the retina 8 to display the scanned image.

In this embodiment, the projection optical system for projecting the scan beam of the optical scanner 5 into the pupil 7 employs the two curved mirrors 2 and 3 formed at right and left of the lens 1. Accordingly, even if the optical scanner 5 has a small deflection/scan angle, the focal distance of the curved mirror 3 in front of the pupil 7 can be made smaller than the focal distance of the curved mirror 2 arranged nearer to the optical scanner 5, so as to make the angle range of the incident beam to the pupil 7 greater than the deflection/scan angle in the optical scanner 5, thus enabling to form an image of a large field of view on the retina.

For example, if the first curved mirror 2 has a focal distance of 4.5 cm and the second curved mirror 3 has a focal distance of 1.5 cm, the scan angle of the beam viewed from the eye is increased by three times. This means that if the beam emitted from the optical scanner has a scan angle of 10 degrees, it is possible to display a large image having 30 degrees for the field of view.

Moreover, the two curved mirrors are respectively formed as curved portions at right and left of the lens 1 and have a small weight. That is, the two curved mirrors will not increase the volume and weight of the apparatus, enabling to obtain a spectacles-type image display apparatus having a sufficiently light weight as a whole.

It should be noted that in the image display apparatus according to the present invention, it is possible to provide a mirror partially transmitting a light such as a half mirror as the second curved mirror, so that an outside view through the lens can be superimposed with a display image.

Furthermore, in the aforementioned embodiment, the first and the second curved mirrors are arranged at right and left of a lens, but the first and the second curved mirrors can also be arranged at an upper position and a lower position of the lens.

As has been described above, the image display apparatus according to the present invention includes the two curved mirrors provided as curved portions at right and left of a spectacle lens, so that a scan beam from the optical scanner is successively reflected and focused by these two curved mirrors, so as to be projected in the pupil 7 of the eyeball.

Accordingly, even if the scan beam has a small deflection angle, it is possible to obtain a large angle range of the beam projected into the pupil, so that an image of a large field of view can be focused on the retina to display a large image.

Moreover, the two curved mirrors that are light in weight are formed as curved portions at right and left of a spectacle lens. Accordingly, these curved mirrors substantially does not increase the volume or weight, enabling to obtain a sufficiently light spectacle-type image display apparatus.

Furthermore, the present invention enables to reduce the deflection/scan angle of the scan beam, which in turn enables to reduce the vibration/rotation angle of the movable mirror of the optical scanner. This significantly increases the reliability of the optical scanner.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-326706 (Filed on Nov. 27$^{th}$, 1997) including specification, claims, drawings and summary are incorporated herein by reference in its entirety.

What is claimed is:

1. An image display apparatus adapted to display an image onto a retina of a user of said image display apparatus, comprising:

a lens supported by a frame;

an optical scanner provided adjacent to said frame for outputting a scan beam toward said lens;

a first mirror having a first curved reflecting surface and being formed at a predetermined position of said lens to reflect said scan beam from said optical scanner; and a second mirror having a second curved reflecting surface and being formed at another predetermined position of said lens to reflect said beam reflected from said first curved mirror to a position adapted to correspond to a retina of a user of said image display apparatus.

2. An image display apparatus as claimed in claim 1, wherein said frame is a spectacle frame and wherein said optical scanner is provided adjacent to a bow portion of said spectacle frame.

3. An image display apparatus as claimed in claim 2, wherein said optical scanner includes a light source for outputting a light beam for displaying said scan image and a movable mirror for deflecting said light beam from said light source, said movable mirror being arranged in a vicinity of a focal point of said first curved mirror; and said second curved mirror is apart from said first curved mirror by a distance approximately equal to a sum of a focal distance of said first curved mirror and a focal distance of said second curved mirror.

4. An image display apparatus as claimed in claim 3, wherein said first curved mirror has a focal distance greater than a focal distance of said second curved mirror.

5. An image display apparatus as claimed in claim 1, wherein said optical scanner includes a light source for outputting a light beam for displaying said scan image and a movable mirror for deflecting said light beam from said light source, said movable mirror being arranged in a vicinity of a focal point of said first curved mirror; and said second curved mirror is apart from said first curved mirror by a distance approximately equal to a sum of a focal distance of said first curved mirror and a focal distance of said second curved mirror.

6. An image display apparatus as claimed in claim 5, wherein said first curved mirror has a focal distant greater than a focal distance of said second curved mirror.

7. An image display apparatus adapted to display an image onto a retina of a user of said image display apparatus comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of said lens to reflect said scan beam reflected from said first curved mirror to a position adapted to correspond to a retina of a user of said image display apparatus, wherein said optical scanner includes a light source for outputting a light beam for displaying said scan image and a movable mirror for deflecting said light beam from said light source, said movable mirror being arranged in a vicinity of a focal point of said first curved mirror;

wherein said second curved mirror is apart from said first curved mirror by a distance approximately equal to a sum of a focal distance of said first curved mirror and a focal distance of said second curved mirror, and wherein said movable mirror is constituted by a single mirror capable of at least one of rotating and vibrating in a predetermined angle range around two intersecting axes.

8. An image display apparatus adapted to display an image onto a retina of a user of said image display apparatus, comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of sad lens to reflect said scan beam reflected from said first curved mirror to a position adapted to correspond to a retina of a user of said image display apparatus, wherein said optical scanner is provided on a bow portion of said spectacle frame, wherein said optical scanner includes a light source for outputting a light beam for displaying said scan image and a movable mirror for deflecting said light beam from said light source, said movable mirror being arranged in a vicinity of a focal point of said first curved mirror, wherein said second curved mirror is apart from said first curved mirror by a distance approximately equal to a sum of a focal distance of said first curved mirror and a focal distance of said second curved mirror, and wherein said movable mirror is constituted by a single mirror capable of at least one of rotating and vibrating in a predetermined angle range around two intersecting axes.

9. An image display apparatus adapted to display an image onto a retina of a user of said image display apparatus, comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of said lens to reflect said scan beam reflected from said first curved mirror to a position adapted to correspond to a retina of a user of said image display apparatus, wherein said optical scanner includes a light source for outputting a light beam for displaying said scan image and a movable mirror for deflecting said light beam from said light source, said movable mirror being arranged in a vicinity of a focal point of said first curved mirror, wherein said second curved mirror is apart from said first curved mirror by a distance approximately equal to a sum of a focal distance of said first curved mirror and a focal distance of said second curved mirror, and wherein said movable mirror is constituted by two mirrors, each capable of at least one of rotating and vibrating in a predetermined angle range around an axis and wherein each of said axis are arranged so as to intersect each other.

10. An image display apparatus adapted to display an image onto a retina of a user of said image display apparatus, comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of said lens to reflect said scan beam reflected from said first curved mirror to a position adapted to correspond to a retina of a user of said image display apparatus, wherein said optical scanner is provided on a bow portion of said spectacle frame, wherein said optical scanner includes a light source for outputting a light beam for displaying said scan image and a movable mirror for deflecting said light beam from said light source, said movable mirror being arranged in a vicinity of a focal point of said first curved mirror, wherein said second curved mirror is apart from said first curved mirror by a distance approximately equal to a sum of a focal distance of said first curved mirror and a focal distance of said second curved mirror, and wherein said movable mirror is constituted by two mirrors, each capable of at least one of rotating and vibrating in a predetermined angle range around an axis and wherein each of said axis are arranged so as to intersect each other.

11. An image display apparatus adapted to display an image onto a retina of a user of said image display apparatus, comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of said lens to reflect said scan beam reflected from said first curved mirror to a position adapted to correspond to a retina of a user of said image display apparatus, wherein said optical scanner includes a light source for outputting a light beam for displaying said scan image and a movable mirror for deflecting said light beam from said light source, said movable mirror being arranged in a vicinity of a focal point of said first curved mirror, wherein said second curved mirror is apart from said first curved mirror by a distance approximately equal to a sum of a focal distance of said first curved mirror and a focal distance of said second curved mirror, and wherein said light source is formed on a substrate including a plurality of semiconductor lasers for emitting beams of different oscillation wavelengths from one another and an optical wave-guide channel connected to said plurality of semiconductor lasers so as to output at least one scan beam from a single output end of said optical wave-guide channel.

12. An image display apparatus adapted to display an image onto a retina of a user of said image display apparatus, comprising:

a lens supported by a spectacle frame;

an optical scanner provided on said spectacle frame for outputting a scan beam toward said lens;

a first curved mirror formed at a predetermined position of said lens for reflecting said scan beam from said optical scanner; and a second curved mirror formed at another predetermined position of said lens to reflect said scan beam reflected from said first curved mirror to a position adapted to correspond to a retina of a user of said image display apparatus, wherein said optical scanner is provided on a bow portion of said spectacle frame, wherein said optical scanner includes a light source for outputting a light beam for displaying said scan image and a movable mirror for deflecting said light beam from said light source, said movable mirror being arranged in a vicinity of a focal point of said first curved mirror, wherein said second curved mirror is apart from said first curved mirror by a distance approximately equal to a sum of a focal distance of said first curved mirror and a focal distance of said second curved mirror, and wherein said light source is formed on a substrate including a plurality of semiconductor lasers for emitting beams of different oscillation wavelengths from one another and an optical wave-guide channel connected to said plurality of semiconductor lasers so as to output at least one scan beam from a single output end of said optical wave-guide channel.

13. An image display apparatus for displaying an image onto a retina of a user of said image display apparatus comprising:

a lens supported by a frame;

an optical scanner provided adjacent to a portion of said frame and having a movable mirror for at least one of deflecting and scanning a light beam modulated by a video signal, so as to output a scan beam; and a first curved mirror and a second curved mirror formed at a right side and at a left side of said lens for successively reflecting said scan beam to a position adapted to correspond to a retina of a user of said image display apparatus.

14. An image display apparatus adapted to display an image onto a retina of a user of said image display apparatus comprising:

a lens supported by a frame;

an optical scanner provided adjacent to said frame for outputting a scan beam having a first predetermined arc toward said lens;

a first mirror disposed at a predetermined position of said lens to reflect said scan beam from said optical scanner; and a second mirror disposed at another predetermined position of said lens to focus said scan beam reflected from said first mirror to a focal point of said second mirror, wherein a second predetermined arc, defined by said scan beam output by said second mirror and being measured from said focal point of said second mirror, is greater than said first predetermined arc, and wherein said first mirror has a focal distance greater than a focal distance of said second mirror.

15. An image display apparatus as claimed in claim 14, wherein said optical scanner includes a light source for outputting a light beam and a movable mirror for deflecting said light beam from said light source, said movable mirror being arranged in a vicinity of a focal point of said first mirror; and said second mirror is set apart from said first mirror by a distance approximately equal to a sum of a focal distance of said first mirror and a focal distance of said second mirror.

16. An image display apparatus as claimed in claim 15, wherein said movable mirror comprises a single mirror configured to at least one of rotate and vibrate in a predetermined angle range around two intersecting axes.

17. An image display apparatus as claimed in claim 15, wherein said movable mirror comprises two mirrors, each of said two mirrors configured to at least one of rotate and vibrate in a predetermined angle range around a respective axis, and wherein each of said respective axis intersects with another of said respective axis.

18. An image display apparatus a claimed in claim 15, wherein said light source further comprises a plurality of semiconductor lasers disposed on a substrate, each of said plurality of semiconductor lasers emitting beams of predetermined oscillation wavelengths, and an optical wave-guide channel connected to said plurality of semiconductor lasers so as to output at least one scan beam from a single output end of said optical wave-guide channel.

* * * * *